US008955988B1

(12) United States Patent
Coley et al.

(10) Patent No.: US 8,955,988 B1
(45) Date of Patent: Feb. 17, 2015

(54) IMAGE MODIFICATION IN OPTICAL PATH

(71) Applicant: Rawles LLC, Wilmington, DE (US)

(72) Inventors: Christopher David Coley, Morgan Hill, CA (US); Eric Gifford Marason, San Francisco, CA (US)

(73) Assignee: Rawles LLC, Wilmington, DE (US)

( * ) Notice: Subject to any disclaimer, the term of this patent is extended or adjusted under 35 U.S.C. 154(b) by 0 days.

(21) Appl. No.: 14/183,129

(22) Filed: Feb. 18, 2014

Related U.S. Application Data

(63) Continuation of application No. 13/856,400, filed on Apr. 3, 2013, now abandoned, which is a continuation of application No. 13/467,776, filed on May 9, 2012, now abandoned, which is a continuation of application No. 13/096,577, filed on Apr. 28, 2011, now abandoned.

(51) Int. Cl.
*G03B 21/14* (2006.01)

(52) U.S. Cl.
CPC .................................... *G03B 21/147* (2013.01)
USPC .................. 353/101; 353/69; 353/70; 353/46

(58) Field of Classification Search
USPC .............. 353/38, 69, 70, 79, 101, 46, 50, 51; 349/5–9
See application file for complete search history.

(56) References Cited

U.S. PATENT DOCUMENTS

| 5,597,222 | A | 1/1997 | Doany et al. |
|---|---|---|---|
| 6,604,829 | B2 | 8/2003 | Rodriguez, Jr. |
| 6,619,804 | B2 | 9/2003 | Davis et al. |
| 7,175,281 | B1 | 2/2007 | Berman |
| 7,413,312 | B2 | 8/2008 | Engle et al. |
| 7,909,472 | B2 | 3/2011 | Hirata et al. |
| 7,965,146 | B2 | 6/2011 | Ito |
| 8,172,404 | B2 | 5/2012 | Silverstein et al. |
| 2009/0021801 | A1 | 1/2009 | Ishihara |
| 2009/0040467 | A1 | 2/2009 | Yamauchi et al. |
| 2010/0020289 | A1 | 1/2010 | Kamijima |
| 2010/0053565 | A1 | 3/2010 | Mizushima et al. |
| 2010/0141902 | A1 | 6/2010 | Destain et al. |
| 2010/0232039 | A1 | 9/2010 | Chen et al. |
| 2011/0013149 | A1 | 1/2011 | Utsunomiya |

OTHER PUBLICATIONS

U.S. Appl. No. 13/467,776, filed May 9, 2012, Christopher D. Coley, et al., "Image Modification in Optical Path".
Non-Final Office Action for U.S. Appl. No. 13/467,776, mailed on Aug. 30, 2012, Christopher Coley et al., "Image Modification in Optical Path" 6 pages.
Pinhanez, "The Everywhere Displays Projector: A Device to Create Ubiquitous Graphical Interfaces", IBM Thomas Watson Research Center, Ubicomp 2001, 18 pages.

*Primary Examiner* — William C Dowling
(74) *Attorney, Agent, or Firm* — Lee & Hayes, PLLC

(57) ABSTRACT

An optical assembly includes an imaging element to generate an image and a module configured to adjust a throw ratio of the image which also forms an intermediate real image at an intermediate real image plane. A dynamic optical component positioned relative to the optical path to receive the intermediate real image is configured with one or more optical components which laterally translate a projected image without keystone distortion.

39 Claims, 10 Drawing Sheets

| DESIRED TRANSLATION OFFSET (X,Y) 902 | LENS DISPLACEMENT (X,Y) 904 |
|---|---|
| 0 | 0,0 |
| 100,200 | +1,2 |
| 2800, -500 | +28,-5 |
| 0,7800 | 0,78 |
| -47,0 | -0.47,0 |
| ⋮ | |

FIG. 9

IMAGE MODIFICATION IN OPTICAL PATH

This application is a continuation of, and claims priority to U.S. patent application Ser. No. 13/856,400, filed Apr. 3, 2013, which is a continuation of, and claims priority to, U.S. patent application Ser. No. 13/467,776, filed May 9, 2012, which is a continuation of, and claims priority to, U.S. patent application Ser. No. 13/096,577, filed Apr. 28, 2011, all which are incorporated herein by reference.

BACKGROUND

Optical systems such as image projectors are used in a wide variety of applications, including entertainment, augmented reality environments, and so forth. While an image is ideally presented on a surface which is orthogonal to a projector axis of the image projector, such alignment is not always available. For example, distortion such as keystoning may occur when the image projector pans to project an image at an extreme corner of a projection surface. This distortion occurs because of the non-perpendicular angle between the projection surface and the projector axis.

Furthermore, the size of the projected image may vary to allow the projected image to fit within the confines of a particular projection surface. Traditional image projection systems which address the distortion and changing image size introduce significant complexity, cost, and increase other forms of distortion or noise into the projected image.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 9 is an illustrative table of desired translation offsets of an image and associated lens displacements, such as may be used by the image projectors of FIGS. 1-5.

DETAILED DESCRIPTION

Figure 1:
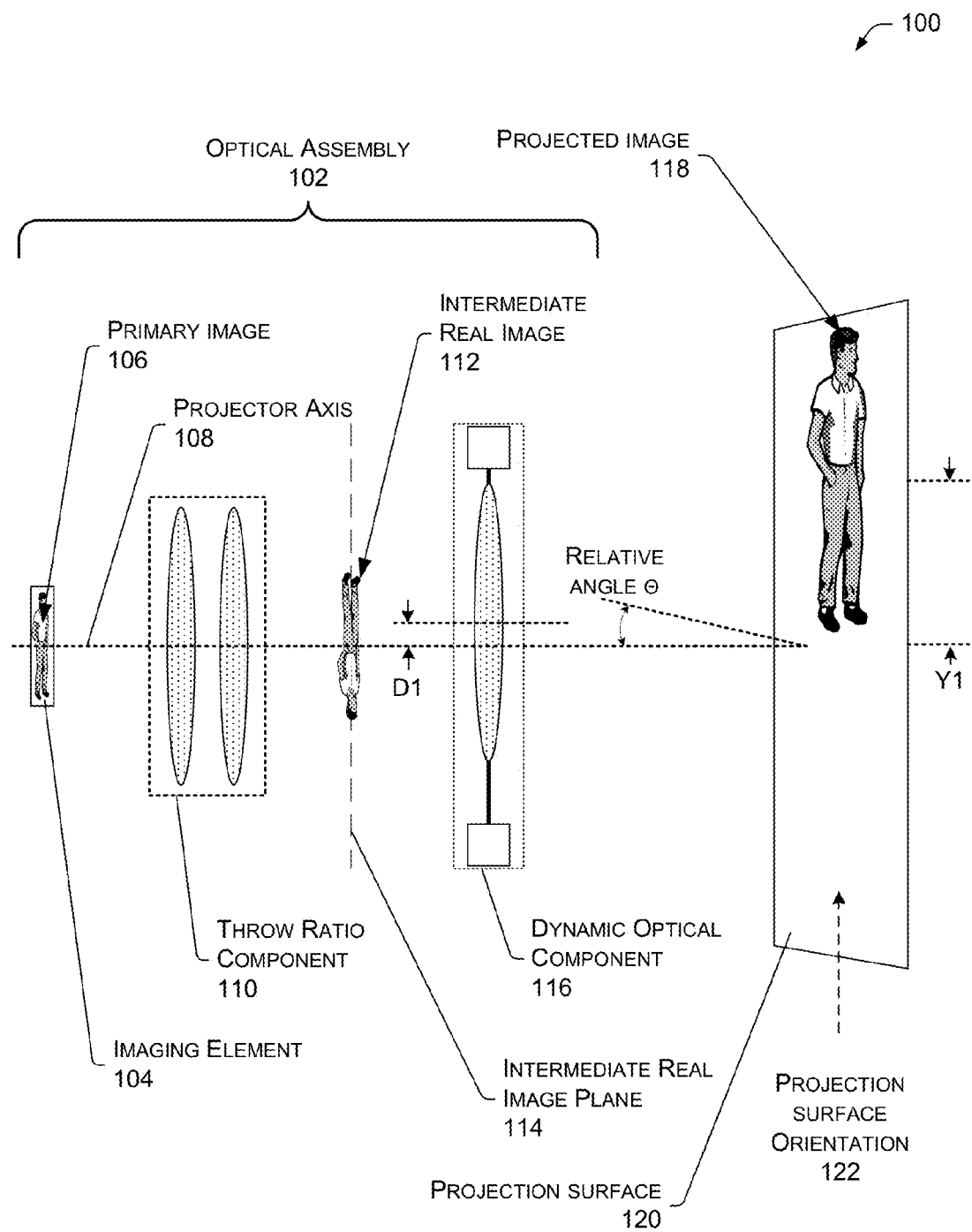
FIG. 1 shows an illustrative image projector assembly having an intermediate real image at an intermediate real image plane and a dynamic optical component.

Optical systems including image projectors, cameras, and so forth are used in a wide variety of applications, including engineering, equipment maintenance, entertainment, augmented reality environments, and so forth. In the simplest image projection case, the image projector and the projection surface are at fixed locations with a projected image at a fixed size and a projector axis perpendicular to the projection surface. However, the situation becomes more complicated when the size of the projected image is variable, the image is displaced to different regions on the projection surface, or the projection surface is portable or in motion.

In some environments, the size of the projected image varies. For example in an augmented reality environment the size of the projected image may vary to fit on a wall, tabletop, portable projection screen, while tracking a moving projection surface as distance increases and decreases, and so forth. This change is size is also known as a change in the throw ratio. The throw ratio in a projection system is the distance from the projector to the projection surface divided by the width of the screen. Thus, changing the throw ratio may be considered to magnify or minify the image as projected.

Regardless of size, an image is ideally presented on a surface which is orthogonal to a projector axis of the image projector. Maintaining this orthogonality in augmented reality environments where a variety of fixed or mobile projection surfaces are positioned about the environment is desirable to maintain image quality. Image quality may be degraded by loss of resolution, distortion, and so forth.

Distortion of the projected image occurs when the projector axis and the projection surface are not orthogonal. For example, in a simple case such as where the projector tilts upwards to project on an upper portion of a wall, the projected image may experience the "keystone effect" or "keystoning" along a vertical axis wherein the projected image appears to be trapezoidal rather than rectangular. Keystoning may occur along the vertical and horizontal axes simultaneously, such as where the projector tilts upwards and to the left to place the projected image in a corner of the wall. The resulting projected image in this case takes on the shape of a general irregular quadrilateral. These distortions cause the projected image to deviate from the intended image. When the projected image is called to move across a projection surface such as a wall, the projector may be rotated to move the image. However, this rotation results in a non-zero angle between the projector axis and the projection surface, resulting in keystoning and other adverse image effects.

Described herein are devices and techniques for an optical assembly configured to allow changes in throw ratio as well as translating or laterally moving an image along a projection surface while maintaining image quality. An optical path is configured such that an intermediate real image is formed at an intermediate real image plane located between a throw ratio component and a dynamic optical component. The throw ratio component is configured to change the throw ratio of the projected image through magnification or minification of an image generated by an imaging element. The dynamic optical component is configured to selectively adjust optical characteristics to take the formed intermediate real image and generate a projected image which is linearly translated. Optical components such as lenses, mirrors and so forth within the optical path of the projection are displaced, producing the translation. This linear translation has the effect of moving the image across the projection surface without rotating the projector. By accomplishing the translation without rotating the entire optical assembly, the projector axis may be maintained generally perpendicular relative to the projection surface with a resulting improvement in image quality. The translated image is then projected onto the projection surface. Where any residual keystoning does occur, correction may be made by adjusting the primary image via scaling or other techniques.

Determination as to throw ratio, linear translation, image rotation, and other factors may be made after assessing characteristics of the physical environment including the projection surface, orientation of the projection surface, relative angles between the projection surface and the projector axis, and the requirements of the image presentation system. These characteristics may be determined via rangefinder, structured light, embedded tags, motion sensors, manual input, and so forth.

While the following discussion and description are made with regard to an image projection system, the devices and techniques described herein may be used for other optical systems, such as cameras. In some implementations a camera and a projector may be configured to share at least a portion of a common optical path.

Illustrative Projection Systems

FIG. 1 shows an illustrative projection system 100 configured to generate and project an image on a projection surface. In this and the following illustrations, lenses, mirrors, filter, mounts, and other components are omitted for clarity, and not by way of limitation. While the projected images are depicted and described as being in visible light it is understood that images in other non-visible electromagnetic wavelengths may be projected, such as infrared, ultraviolet, and so forth.

The projection system 100 includes a optical assembly 102. The optical assembly includes an imaging element 104. The imaging element is configured to generate a primary image 106. The imaging element 104 may generate the primary image upon command by a computer processor. The imaging element 104 may comprise a digital micromirror device (DMD), liquid crystal on silicon (LCOS), liquid crystal display (LCD), one or more lasers, light valve, per-imaged optical film, and so forth. In some implementations, multiple imaging elements 104 may be used.

Extending throughout the optical assembly 102 and associated optics is a projector axis 108. The projector axis 108 may be considered the "centerline" of the optical system along which light propagates through the projection system and ultimately onto the projection surface when no dynamic correction for linear translation is applied.

Within the optical assembly 102, a throw ratio component 110 is configured in the optical path along the projector axis 108. The throw ratio component 110 is configured to magnify or minify the primary image 106. Changes in the throw ratio act to "zoom" the image, ultimately making the projected image larger or smaller. In some implementations the throw ratio component 110 may be configured such that it is telecentric. A multi-element optical system is telecentric when the chief rays for points across the object or image are collimated.

An intermediate real image 112 is formed at an intermediate real image plane 114 positioned after the throw ratio component 110 in the optical path. The intermediate real image 112 is a fully formed real image of the primary image 106, as affected by the throw ratio component 110. By forming the intermediate real image 112 at this point in the optical path, the overall complexity of the optical system is reduced. The formation of the intermediate real image 112 allows the optical separation of the image modification into the two separate stages of throw ratio changes as previously described and linear translation, as described next.

The intermediate real image 112 passes through the dynamic optical component 116 and associated optical components. Displacements or other changes to the optical components of the dynamic optical component 116 within the optical path result in linear translation of a projected image 118. The projected image 118 is projected upon the projection surface 120. The projection surface 120 may be at some relative angle θ between the projector axis 108 and a line orthogonal to the projection surface 120. This relative angle θ may be used to determine scaling or correction factors applied to the imaging element 104, adjustments to the dynamic optical component 116, or both. A projection surface orientation 122 is shown, indicating an intended orientation of the projected image 118 relative to a user.

Adjusting the dynamic optical component 116 linearly translates the projected image 118. For example, as shown here a lens within the dynamic optical component 116 has been displaced along the Y axis by distance D1 relative to the projector axis 108. As called for to create a desired image linear translation, the lens may be displaced along the X axis, or the X and Y axes contemporaneously. This displacement introduces an image linear translation, shifting the projected image 118 along the projection surface 120. By adjusting the optics within the optical path for throw ratio and linear translation separately, optical noise and aberration are reduced. Furthermore, maintaining the projector axis 108 orthogonal to the projection surface and translating the image significantly reduces or eliminates keystoning. Where some keystoning persists, scaling may be applied to the primary image 106 at the imaging element 104, resulting in no or minimal loss in resolution of the projected image 118 on the projection surface 120. In some implementations the dynamic optical component 116 may be configured such that it is telecentric.

The dynamic optical component 116 may be configured to linearly translate or otherwise affect the projected image 118 by physically moving the optical components in the optical path such as lenses, mirrors, diffraction gratings, and so forth. These movements may be linear, rotational, or a combination thereof.

Piezoelectric actuators, linear motors, rotary motors, electroactive polymers, and so forth may provide displacement of the optical components. In other implementations, the optical components may themselves be configured to change shape or configuration. In one example, a liquid lens may be used which is configured to vary in shape to provide the necessary optical changes called for in generating the projected image. In another example, an active or deformable mirror may be configured such that the surface shape is variable upon command as found in adaptive optical systems. Such variable geometry optics may be used to provide projected images 118 suitable for use on non-planar projection surfaces 120. For example, a projection surface 120 which has a single radius of curvature may receive a projected image 118 as adjusted by a deformable mirror.

The optical assembly 102 may also comprise or be coupled to one or more projection surface assessment components including a rangefinder, structured light system, embedded tags, motion sensors, depth based camera system, and so forth. For example, a depth based camera system may comprise a camera and an emitter to use time of flight of light to determine absolute distance, relative distance, or both distances to an object. These projection surface assessment components may be configured to determine distance between the projection assembly 102 and the projection surface, the relative angles between the projector axis 108 and the projection surface 120, shape of the projection surface 120, and so forth.

Figure 2:
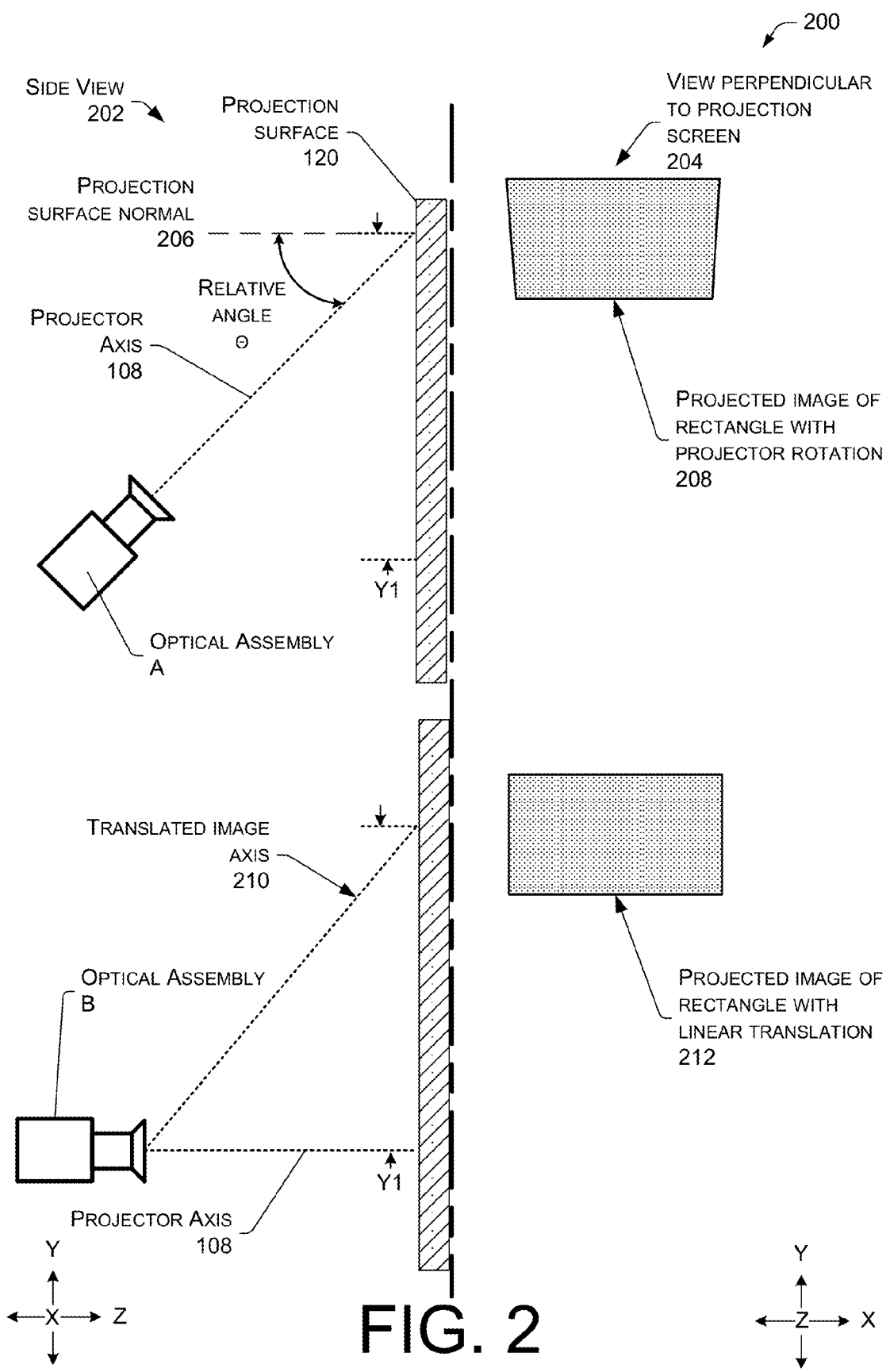
FIG. 2 illustrates linear translation of a projected image.

FIG. 2 illustrates linear translation of a projected image 200. A side view 202 and a view perpendicular to the projection screen 204, such as from the perspective of a user, are shown. A first optical assembly "A" is shown. This optical assembly "A" is shown rotated such that the projected image has been displaced a distance Y1 along the projection surface 120. As a result of this rotation, angle θ relative to a projection surface normal 206 extending from the projection surface 120 is non-zero. As shown on the right, the projected image of a rectangle with projector rotation 208 suffers from keystoning and is distorted.

In contrast, optical assembly "B" is oriented such that the projector axis 108 is perpendicular to the projection surface 102. Due to displacement of the optical elements within the dynamic optical component 116, the projected image has been displaced along a distance of Y1 along the projection surface 120, as indicated by a translated image axis 210. Because of this linear translation, a projected image of the rectangle 212 is free from the keystoning or other distortions.

Figure 3:
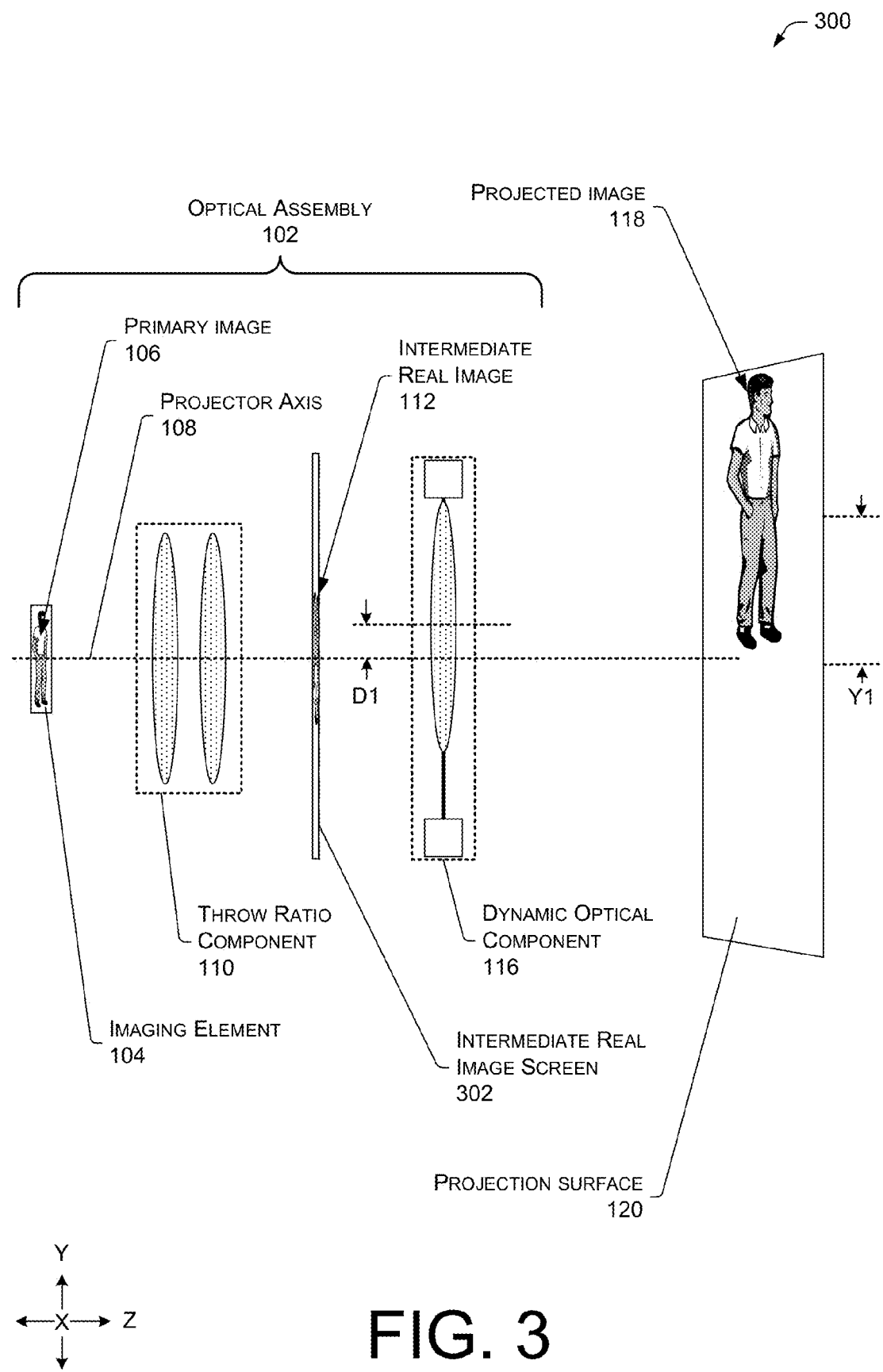
FIG. 3 shows an illustrative image projector assembly having an intermediate real image screen positioned at the intermediate real image plane.

FIG. 3 shows an illustrative image projector 300 having an intermediate real image screen 302. As shown here, within the optical path the intermediate real image 112 is presented on an intermediate real image screen 202. The intermediate real image screen 302 may be a semi-transparent material.

In some implementations, the use of the intermediate real image screen 302 may reduce certain optical artifacts and aberrations or allow for introduction of optical effects. For example, the intermediate real image screen 302 may be configured to adjust color content of the image. The intermediate real image screen 302 may also be configured to dynamically transition upon command, such as from a processor, between states ranging from a substantially transparent state to a substantially opaque state. For example, in some implementations best projected image quality for a particular image may be accomplished by rendering the intermediate real image screen 302 transparent, while another particular image is best rendered when the intermediate real image screen 302 is about 50% transparent.

Figure 4:
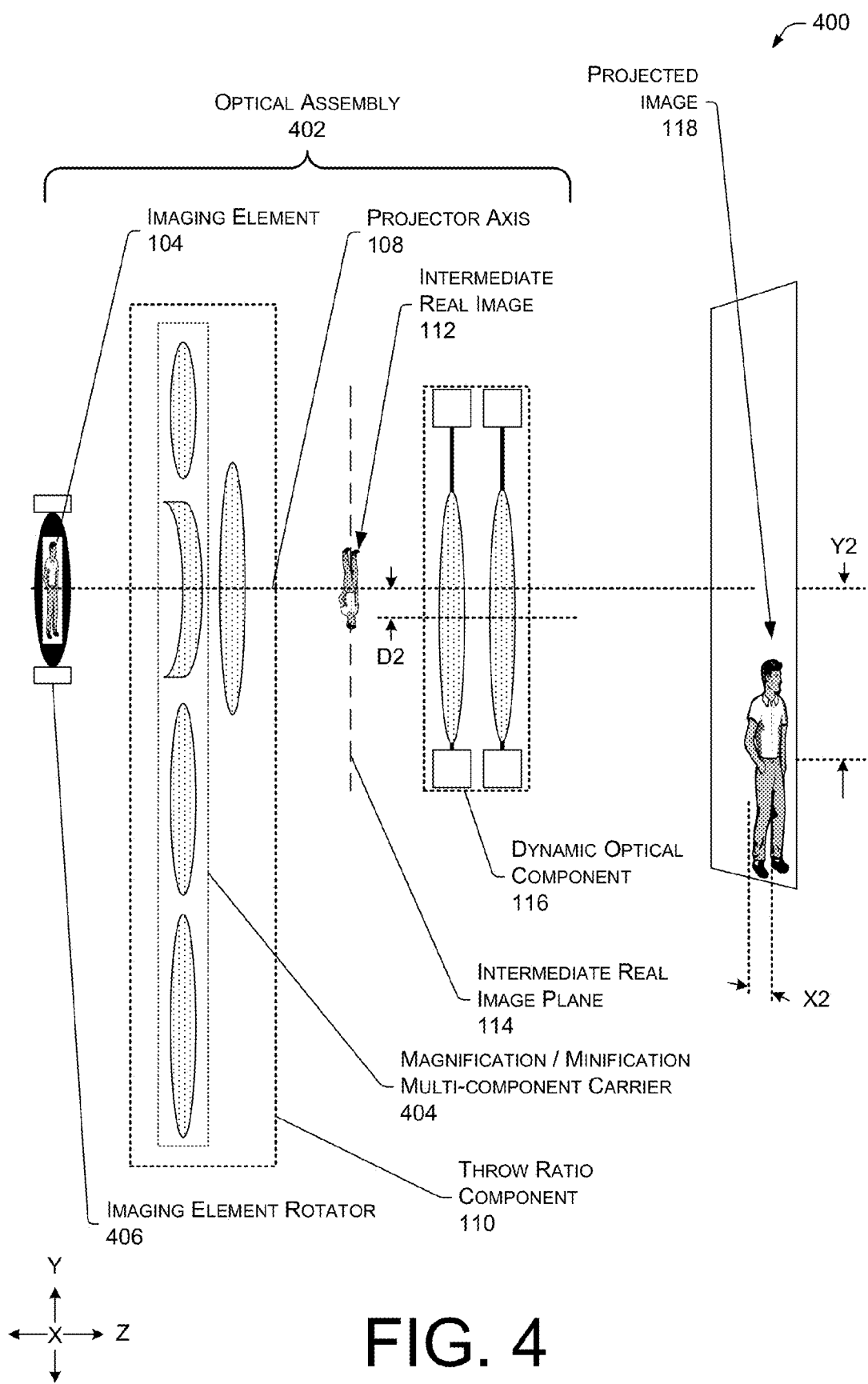
FIG. 4 shows an illustrative image projector assembly having a throw ratio component with an optical multi-component carrier and a dynamic optical component with multiple optical components linearly displaced relative to the projector axis.

FIG. 4 shows another illustrative image projector 400. In this illustration, the optical assembly 402 includes a throw ratio component 110 configured with a plurality of optical components which may be selectively imposed into the projector axis 108 at the throw ratio component 110. As shown here, an optical multi-component carrier and a dynamic optical component with multiple optical components displaced independently of one another relative to the optical path. By providing a plurality of optical components, the throw ratio component 110 may readily accommodate a variety of magnification and minification powers with minimal bulk in a simpler overall optical assembly.

As shown here, the throw ratio component 110 incorporates a magnification/minification multi-component carrier 404. Within this carrier are a variety of lenses. The carrier may be physically displaced relative to the optical path such that, upon command, a particular optical component is placed within the optical path. For example, a +2 diopter lens may be called for during projection of one image, while a −1 diopter lens may be called for during presentation of another image. By moving the carrier 404, the desired +2 and −1 lenses may be used in the optical path to achieve a desired throw ratio.

As described above and also shown in the optical assembly 402, a plurality of optical elements within the dynamic optical component 116 may be moved. Here, the dynamic optical component 116 comprises two lenses. The lenses are displaced a distance D2 relative to the projector axis 108. These displacements may be determined to provide the projected image 118 which has an image linear translation offset of X2 and Y2 along the X and Y axis, respectively. As described above, in some implementations different optical elements may be configured to displaced along one or more axes. For example, a first optical element may be configured to move only within the X axis, while a second optical element within the dynamic optical component 116 may be configured to move only within the Y axis.

The orientation of the projection surface 120 relative to the optical assembly 402 may vary. For example, in an augmented reality environment a portable projection surface may be relocated or a user may change the orientation of their head, such as when lying down. An imaging element rotator 406 may be configured to rotate the imaging element 104 such that the projected image 118 is aligned with the projection surface orientation 122.

Figure 5:
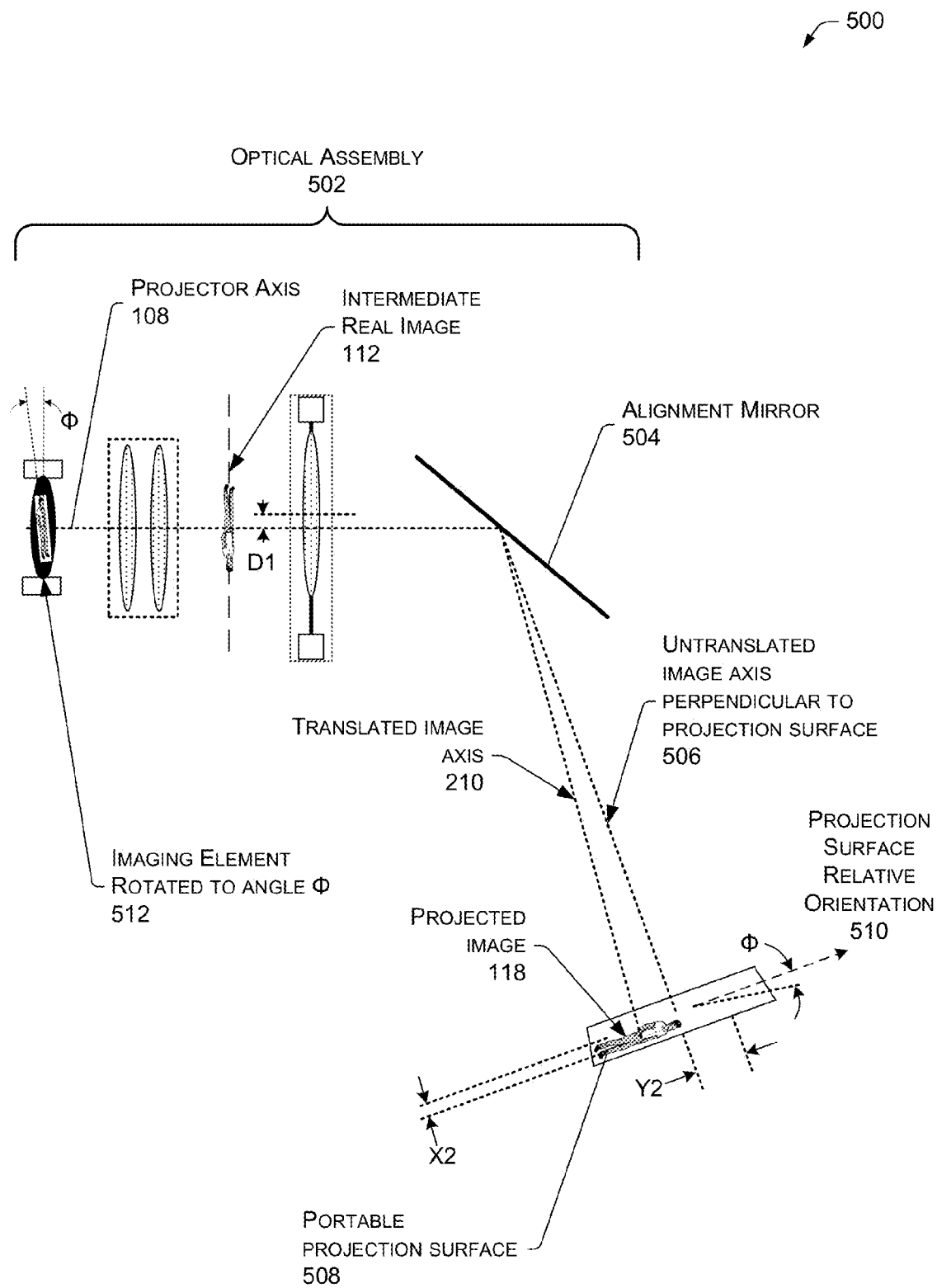
FIG. 5 illustrates an environment with the optical assembly having an alignment mirror.

FIG. 5 illustrates an environment 500 with the optical assembly having an alignment mirror configured to change the location of the projected image. As shown here, the optical assembly 502 includes an alignment mirror 504. In some implementations, rather than repositioning the optical assembly to point at different walls comprising the environment, the alignment mirror 504 may be used to redirect the projected image 118. A computing device, such as described below with regards to FIG. 8, may determine the orientation of the alignment mirror 504.

As shown here, the optical assembly 502 may be mounted horizontally. The projected image 118 strikes the alignment mirror 504 which is angled such that the projected image 118 is presented downward. The alignment mirror 504 is configured to maintain an untranslated image axis perpendicular to the projection surface 506. As shown here, the projection surface may be a portable projection surface 508. The portable projection surface 508 may be a sheet of material such as paper or plastic, a projection surface which is part of an electronic or mechanical device, and so forth. A projection surface relative orientation 510 is determined as having an angle Φ. The imaging element rotator 406 may be configured to rotate the imaging element 104 to the angle Φ 512 such that the projected image 118 is aligned with the projection surface orientation 122. By adjusting the displacement of optical elements within the dynamic optical component 116, the projected image 118 has been linearly translated. As a result, the translated image axis 210 is shown as differing from the untranslated image axis perpendicular to the projection surface 506.

As also shown here, the throw ratio in the throw ratio component 110 has been configured to maintain the predetermined throw ratio. As a result, the resulting image size of the projected image 118 on the portable projection surface 508 is adjusted for size and the relative distance between the portable projection surface 508 and the optical assembly 502.

Figure 6:
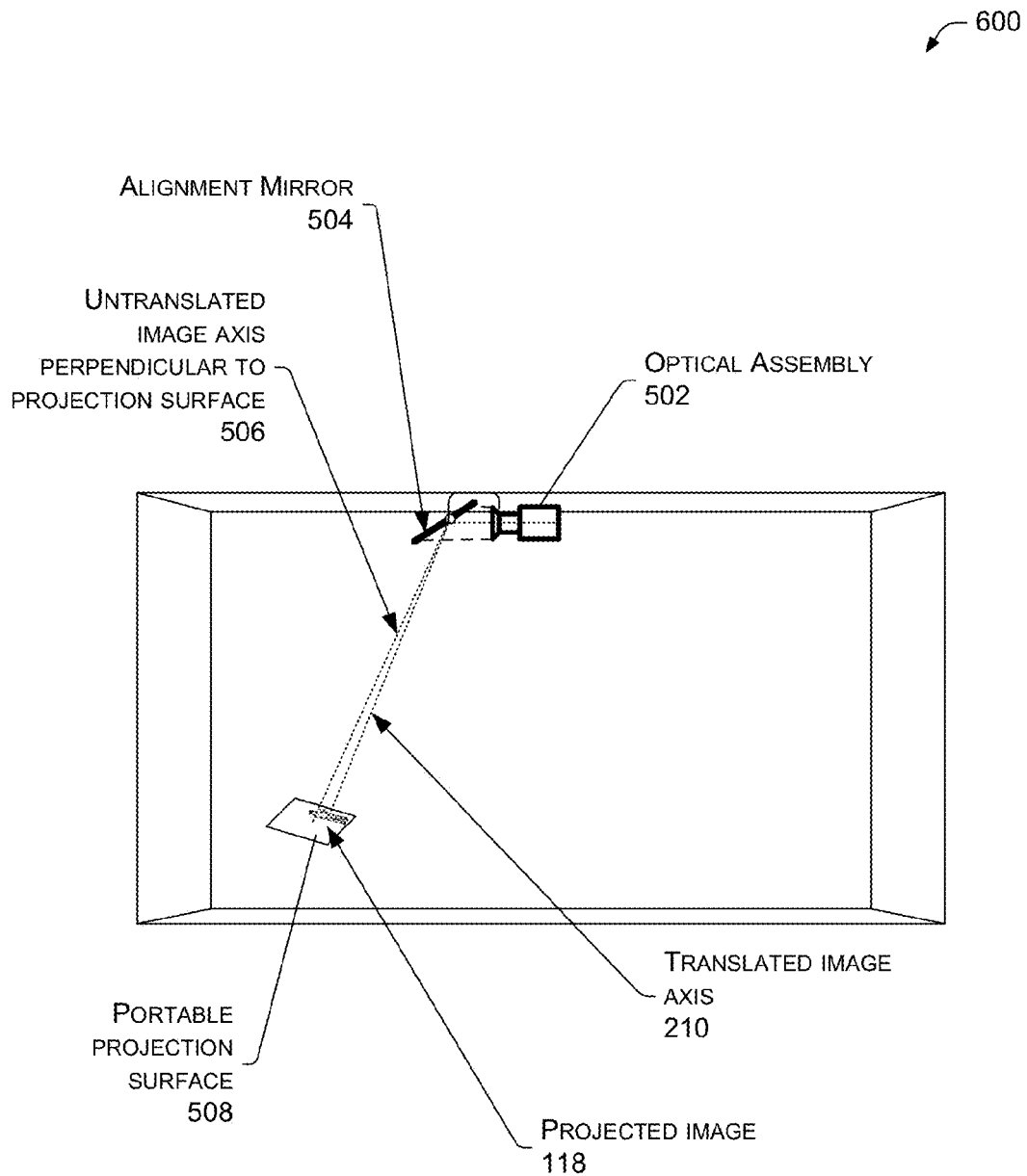
FIG. 6 illustrates an environment with the optical assembly and alignment mirror projecting an image on a portable projection surface.

FIG. 6 illustrates an environment 600 in which the optical assembly and alignment mirror are projecting an image on a portable projection surface. As described above, the alignment mirror 504 is configured to maintain the untranslated image axis perpendicular to the projection surface 506. The translated image axis 210 shows the linear offset of the projected image 118 which is substantially free from keystoning.

Figure 7:
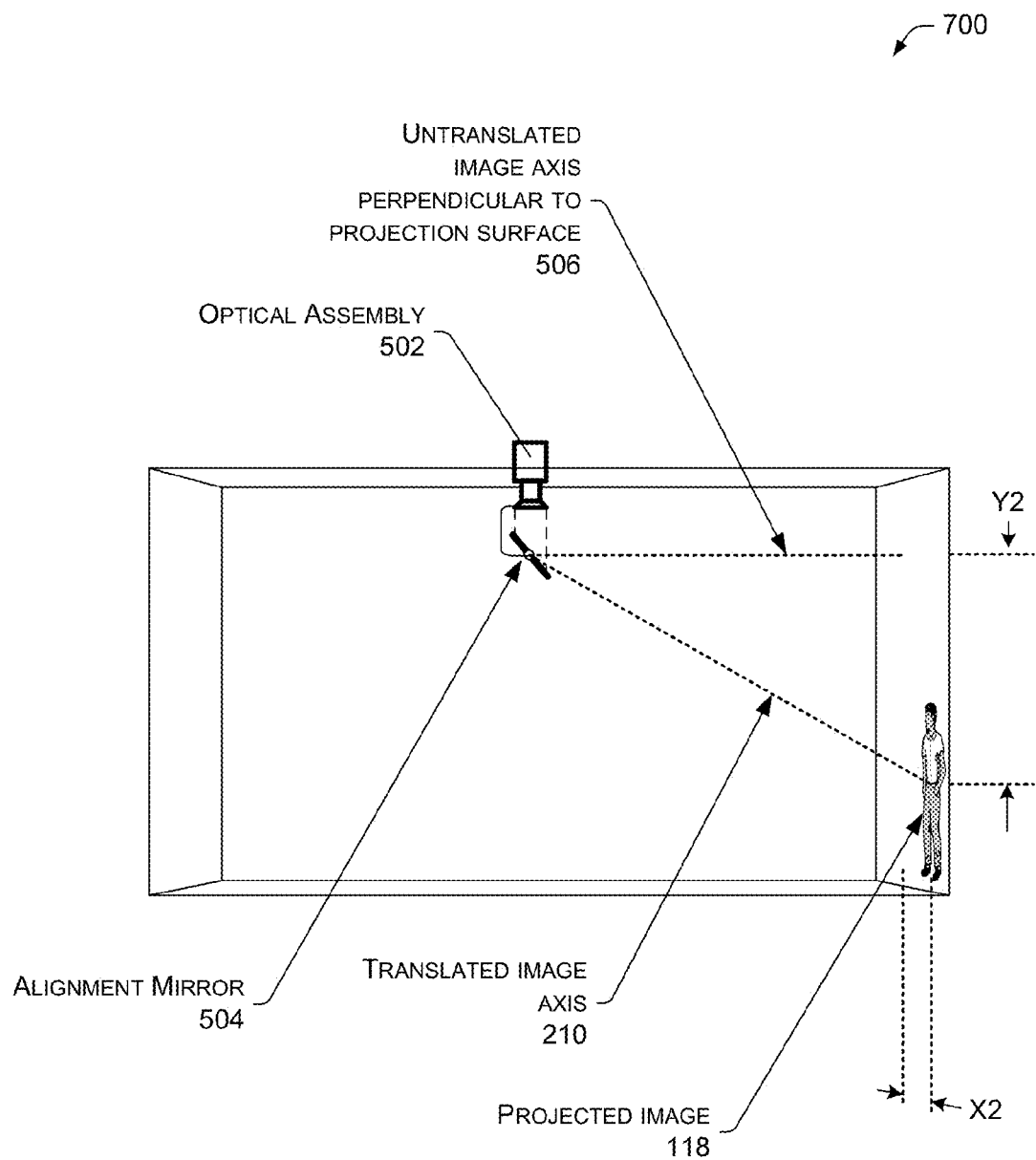
FIG. 7 illustrates an environment with the optical assembly and alignment mirror projecting an image on a stationary projection surface.

FIG. 7 illustrates an environment 700 having the optical assembly with alignment mirror and a fixed projection surface, such as a wall. As shown here, the alignment mirror 504 has configured the untranslated image axis to be perpendicular to the projection surface 506. By displacing one or more optical elements within the dynamic optical component 116, the projected image 118 has been linearly translated along the projection surface 120. As shown here, because of the larger size of the projection surface (a wall rather than a handheld portable projection screen) the throw ratio component 110 has been configured to provide a larger projected image 118.

Figure 8:
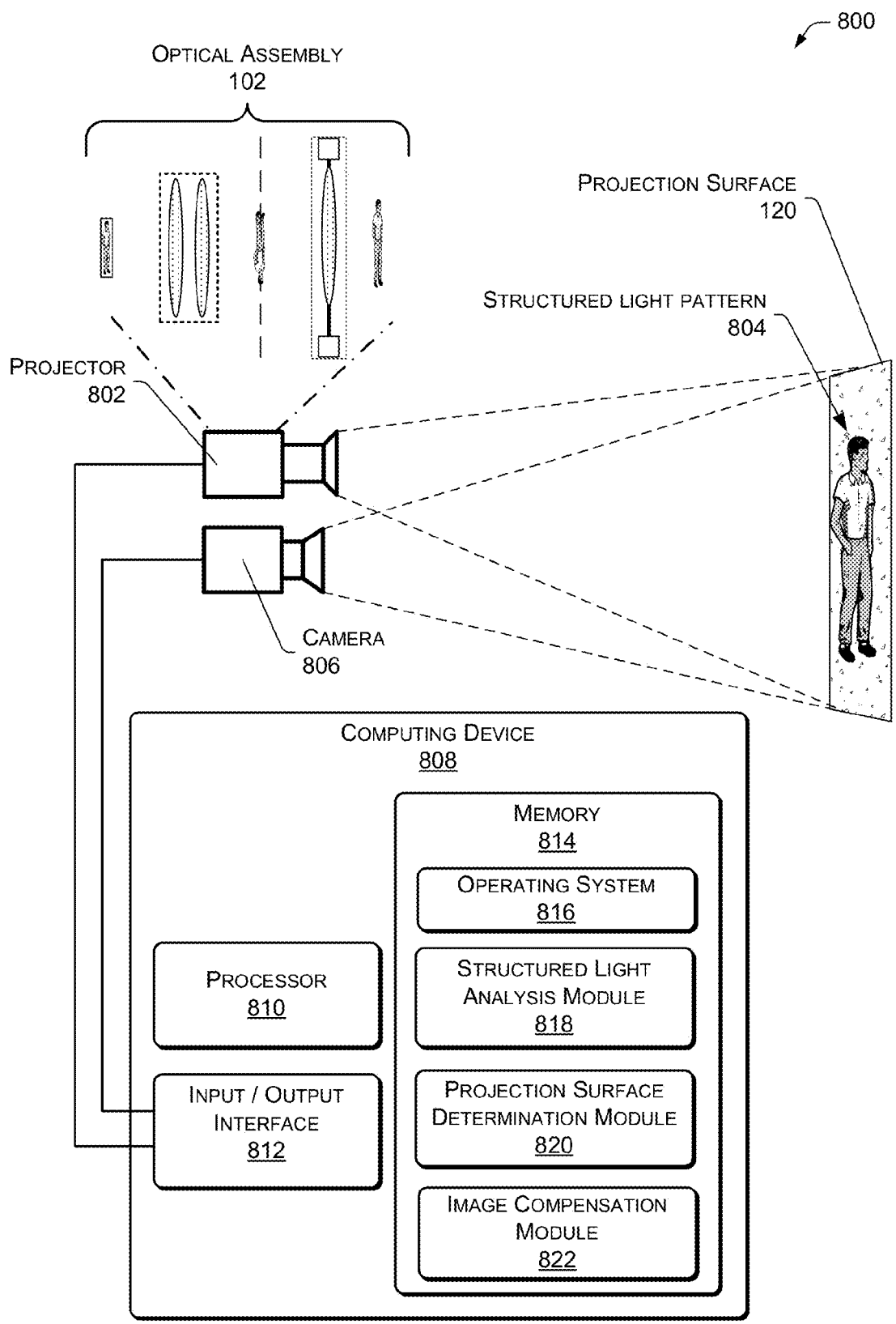
FIG. 8 is an illustrative architecture of an image projector producing an image.

FIG. 8 is an illustrative architecture 800 of an image projection system. A projector 802 is configured according to one of the implementations described above in FIGS. 1-5 to produce images with a pre-determined throw ratio and linear translation during operation. The projector 802 may also generate a structured light pattern 804. In some implementations multiple projectors 802 may be used. As shown here, the structured light pattern 804 is projected onto the projection surface 120. The structured light pattern 804 shown in this example is a pseudorandom noise pattern. In other implementations, different structured light patterns may be used, such as a grid or block array. The structured light pattern 804 may also be varied. For example, a first structured light pattern may be used at a first time, a second structured light pattern may be used at a second time, and so forth.

The structured light pattern 804 may be visible or non-visible to a user. The interaction of the structured light pattern 804 with objects within the environment, such as the projection surface 120, provides data which may be used to determine the physical arrangement of objects within the room. For example, the deformation of the structured light pattern and relative spacing between structured light features may be used to determine the throw distance, the relative angle between the projector axis 108 and the projection surface 120, and so forth. A camera 806 detects the deformation of the structured light pattern.

The image captured by the camera 806 is processed by the computing device 808 to determine physical attributes about the scene. The computing device 808 may comprise one or more processors 810, one or more input/output interfaces 812, and a memory 814. The memory 814 may store an operating system 816, structured light analysis module 618, projection surface determination module 820, and image compensation module 822. In some implementations, the resources among a plurality of computing devices 808 may be shared. These resources may include input/output devices, processors 810, memory 814, and so forth. The memory 814 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

The input/output interface 812 may be configured to couple the computing device 808 to the projector 802 and the camera 806. The coupling between the computing device 808 and the external devices such as the projector 802 and the camera 806 may be via wire, fiber optic cable, wirelessly, and so forth.

The structured light analysis module 818 is configured to analyze the structured light pattern 804 as gathered by the camera 806 to determine characteristics about the topology of the scene. The projection surface determination module 820 is configured to use these characteristics to determine parameters such as the distance between the projector 802 and the projection surface 120, orientation and relative angle between the projector axis 108 and the projection surface 120, and so forth.

An image compensation module 822 uses the parameters to determine what throw ratio, linear translation, orientation angle, keystone correction, and so forth are called for in the optical path to generate a desired projected image. This determination may be calculated, use a pre-determined lookup table such as described next with regards to FIG. 9, or a combination thereof. The image compensation module 822 provides data to the input/output interface 812 which in turn affects the physical positioning of optical components within the throw ratio component 110, dynamic optical component 116, imaging element rotator 406, or a combination thereof. The image compensation module 822 may also control the position of the alignment mirror 504.

While these modules are described as being stored in the memory 814 and executed by the processor 810, it is understood that in some implementations all or part of the functions provided by these modules may be performed by devices such as application-specific integrated circuits, field programmable gate arrays, or other dedicated circuitry.

Figure 10:
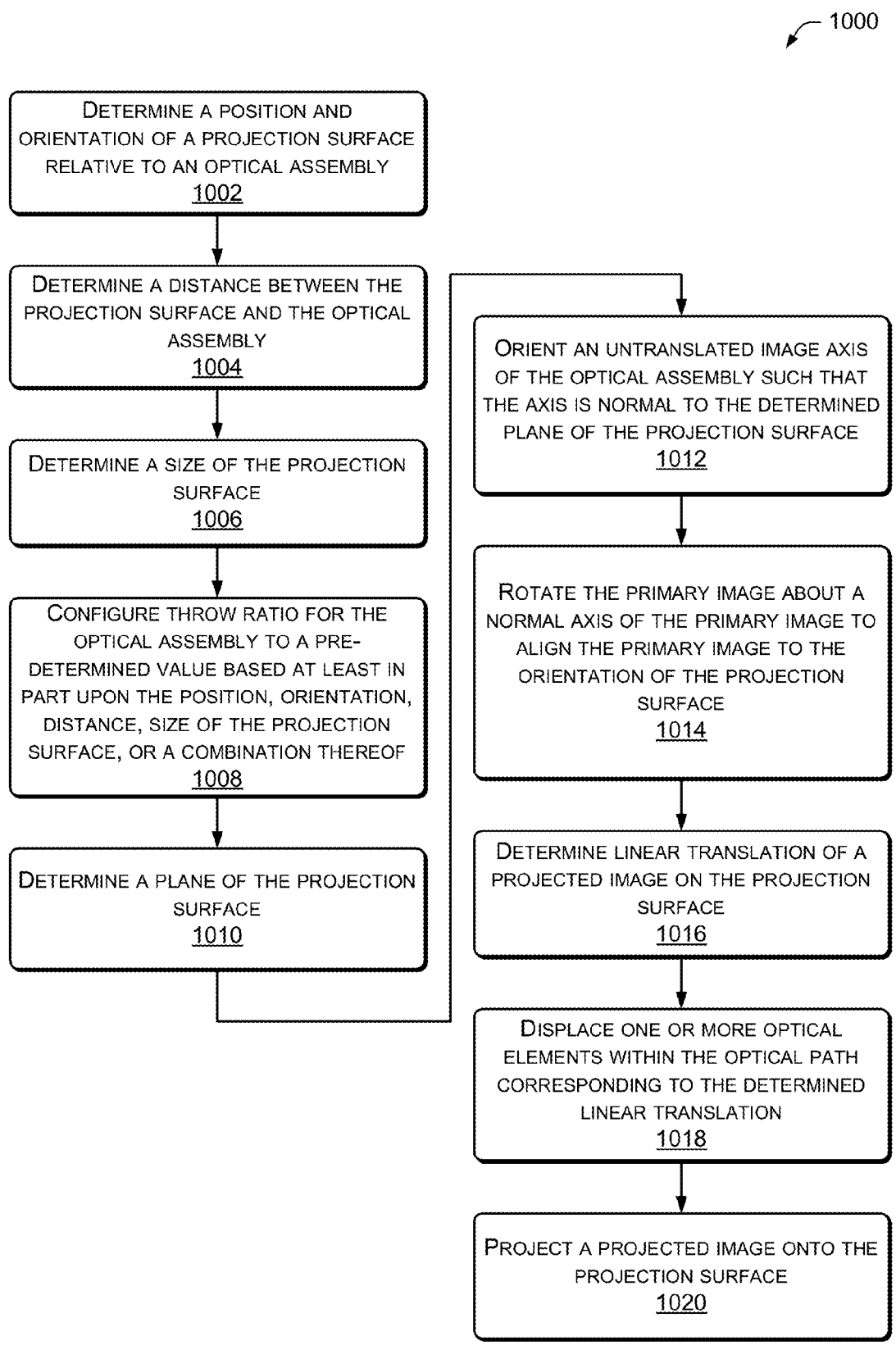
FIG. 10 is a process of generating projected images using an intermediate real image.

FIG. 9 is an illustrative lookup table 900 the image compensation module 822 may use to determine what physical displacements are to be used given a set of environmental conditions. In table 900, a desired image linear translation offset 902 is shown. This offset designates how the projected image is to be translated along the projection surface. Given this desired translation offset 902, a lens displacement 904 along the X and Y axes is presented. When lenses in the dynamic optical component 116 are displaced by this amount, the projected image 118 is also displaced to the desired offset location. For example, where the desired translation offset is +2800 mm along the X axis and −500 mm along the Y axis of the projection surface, the lens displacement may be +28 mm along the X axis and −5 mm along the Y axis.

Where the dynamic optical component 116 incorporates a plurality of configurable optical components, each optical component may have a pre-defined entry within the table 900. As described above, this table 900 may be entirely pre-calculated and stored, partially pre-calculated, or a combination thereof FIG. 10 is a process 1000 of generating images using an intermediate real image. This process 1000 may be implemented by the architectures herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the cited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

At 1002, a position and orientation of a projection surface relative to an optical assembly is determined. At 1004, a distance between the projection surface and the optical assembly is determined. At 1006, a size of the projection surface is determined. For example, the dimensions of the portable projection surface may be ascertained. As described above, the rangefinder, structured light, depth based camera system, and so forth may be used to make these determinations.

At 1008, a throw ratio for the optical assembly is configured to a pre-determined value. This pre-determined value may be based at least in part upon the position, orientation, distance, size, or a combination thereof. The throw ratio determines the size of the projected image. This configuration may include selecting one or more optical components within the optical path, such as one or more lenses of the carrier 404 within the throw ratio component 110. The intermediate real image is formed at the intermediate real image plane 114 with a size determined by the throw ratio.

At 1010, a plane of the projection surface is determined. For example, the projection surface determination module 820 may be configured to determine the orientation of the projection surface 120 in space relative to the optical assembly.

At 1012, an untranslated image axis of the optical assembly is oriented such that the axis is normal to the determined plane of the projection surface. At 1014, the primary image is rotated about its normal axis to align the primary image to the orientation of the projection surface 120.

At 1016, a linear translation of a projected image on the projection surface is determined. For example, it may be determined that the projected image is to be offset +2800 mm along the X axis and −500 mm along the Y axis of the projection surface.

At 1018, at least partly in response to the determined linear translation, one or more optical components within the optical path are displaced corresponding to the determined translation offset. This generates a linearly translated projected image. At 1020, the projected image is projected onto the projection surface. Due to the adjustment of the intermediate real image for desired throw ratio and the linear translation, the resulting image is representative of the intended image.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims

What is claimed is:

1. An image projection system comprising:
a projection surface determination module configured to determine a distance to a projection surface;
an imaging element configured to generate an image;
a throw ratio component configured to change a throw ratio based at least in part upon the determined distance and a pre-determined projected image size, wherein the throw ratio component is configured to generate an intermediate real image from the imaging element at an intermediate real image plane; and
a dynamic optical component configured with one or more displaceable optical components configured to generate a projected image with a linear translation offset from the intermediate real image.

2. The image projection system of claim 1, wherein the throw ratio comprises a distance to the projection surface divided by a width of a projected image.

3. The image projection system of claim 1, wherein the imaging element is configured to rotate such that the projected image is aligned to a relative orientation of the projection surface.

4. The image projection system of claim 1, wherein the projection surface determination module is coupled to a camera configured to recover structured light.

5. The image projection system of claim 1, wherein the projection surface determination module is coupled to a depth based camera system.

6. The image projection system of claim 1, further comprising a rangefinder configured to determine the distance to the projection surface, the rangefinder coupled to the projection surface determination module.

7. The image projection system of claim 1, wherein the imaging element comprises a digital micromirror device.

8. The image projection system of claim 1, wherein the throw ratio component comprises one or more optical components configured to magnify or minify the image from the imaging element.

9. The image projection system of claim 8, wherein one or more of the optical components are coupled to a carrier configured to be moved such that a particular optical component is selectively inserted into the optical path.

10. The image projection system of claim 1, further comprising an intermediate real image screen positioned at the intermediate real image plane.

11. The image projection system of claim 10, wherein the intermediate real image plane is positioned in an optical path between the throw ratio component and the dynamic optical component.

12. The image projection system of claim 1, wherein the one or more displaceable optical components of the dynamic optical component are configured to be displaced relative to an projector axis such that the displacement is configured to generate a projected image having a translated projector axis offset from an untranslated projector axis perpendicular to the projection surface.

13. A system comprising:
an optical assembly comprising an intermediate real image plane positioned in an optical path between an imaging element and a dynamic optical component; and
a computing device configured to control the optical assembly by providing positioning data to position the dynamic optical component such that an intermediate real image at the intermediate real image plane is linearly translated for projection upon a projection surface.

14. The system of claim 13, wherein the dynamic optical component is telecentric.

15. The system of claim 13, the optical assembly further comprising one or more imaging elements comprising a liquid crystal.

16. The system of claim 13, the optical assembly further comprising one or more laser imaging elements.

17. The system of claim 13, further comprising a throw ratio component configured to vary a size of the image on the projection surface.

18. The system of claim 17, wherein the throw ratio component is positioned in the optical path between the imaging element and the intermediate real image plane.

19. The system of claim 17, wherein the throw ratio component is telecentric.

20. The system of claim 13, further comprising a projection surface determination module configured to:
determine a distance between the optical assembly and the projection surface; and
determine a relative orientation of the projection surface.

21. The system of claim 20, further comprising a camera and wherein the projection surface determination module is configured to utilize structured light to determine the distance, relative orientation, or both.

22. A system comprising:
a throw ratio component;
a dynamic optical component positioned after the throw ratio component in an optical path, the dynamic optical component being configured with one or more displaceable optical components; and an intermediate real image plane positioned in the optical path between the throw ratio component and the dynamic optical component.

23. The system of claim 22, wherein at least one of the one or more displaceable optical components is configured to be displaced to generate a linearly translated projected image.

24. The system of claim 22, further comprising an alignment mirror positioned after the dynamic optical component.

25. The system of claim 22, wherein the throw ratio component is configured to vary a size of a projected image on a projection surface.

26. The system of claim 22, further comprising a projection surface determination module configured to determine a distance between the dynamic optical component and the projection surface.

27. One or more computer-readable media storing computer-executable instructions that, when executed, cause one or more processors to perform acts comprising:
   configuring a throw ratio of an optical assembly to a predetermined value;
   determining an image linear translation offset;
   displacing one or more optical components within the optical path corresponding to the determined image linear translation offset to generate a projected image from an intermediate real image at an intermediate real image plane.

28. The one or more computer-readable storage media of claim 27, further comprising determining a throw distance between a projection surface and an optical assembly.

29. The one or more computer-readable storage media of claim 27, wherein the intermediate real image is positioned within an optical path of the optical assembly between an imaging element and the one or more displaceable optical components.

30. The one or more computer-readable storage media of claim 27, the displacing comprising linear translation of one or more of the optical components perpendicular to the optical path.

31. A method comprising:
   configuring a throw ratio of an optical assembly to a predetermined value;
   determining an image linear translation offset; and
   displacing one or more optical components within the optical path corresponding to the determined image linear translation offset to generate a projected image from an intermediate real image at an intermediate real image plane.

32. The method of claim 31, further comprising determining a throw distance between a projection surface and an optical assembly.

33. The method of claim 31, wherein the intermediate real image is positioned within an optical path of the optical assembly between an imaging element and the one or more displaceable optical components.

34. The method of claim 31, the displacing comprising linear translation of one or more of the optical components perpendicular to the optical path.

35. A system comprising:
   a throw ratio component;
   an intermediate real image plane positioned in the optical path between the throw ratio component and a dynamic optical component; and
   the dynamic optical component configured to generate a projected image with a linear translation offset from an intermediate real image at the intermediate real image plane.

36. The system of claim 35, wherein the dynamic optical component comprises one or more displaceable optical components.

37. The system of claim 35, further comprising an alignment mirror positioned after the dynamic optical component.

38. The system of claim 35, wherein the throw ratio component is configured to vary a size of the projected image on a projection surface.

39. The system of claim 35, further comprising a projection surface determination module configured to determine a distance between the dynamic optical component and the projection surface.

* * * * *